(12) United States Patent
Vardimon et al.

(10) Patent No.: US 11,972,639 B2
(45) Date of Patent: Apr. 30, 2024

(54) UNSUPERVISED SIGNATURE-BASED PERSON OF INTEREST DATABASE POPULATION

(71) Applicant: CORSIGHT.AI, Tel Aviv (IL)

(72) Inventors: Ran Vardimon, Tel Aviv (IL); Matan Noga, Tel Aviv (IL); Keren-Or Curtis, Rishon LeTsiyon (IL); Kai Mizrahi, Hadera (IL)

(73) Assignee: CORSIGHT.AI, Tel Aviv (IL)

( * ) Notice: Subject to any disclaimer, the term of this patent is extended or adjusted under 35 U.S.C. 154(b) by 206 days.

(21) Appl. No.: 17/455,399

(22) Filed: Nov. 17, 2021

(65) Prior Publication Data

US 2022/0157084 A1    May 19, 2022

Related U.S. Application Data

(60) Provisional application No. 63/198,855, filed on Nov. 17, 2020.

(51) Int. Cl.
| | |
|---|---|
| *G06F 17/30* | (2006.01) |
| *G06F 16/51* | (2019.01) |
| *G06F 16/532* | (2019.01) |
| *G06V 10/74* | (2022.01) |
| *G06V 10/98* | (2022.01) |
| *G06V 40/16* | (2022.01) |
| *G06V 40/50* | (2022.01) |

(52) U.S. Cl.
CPC .............. *G06V 40/50* (2022.01); *G06F 16/51* (2019.01); *G06F 16/532* (2019.01); *G06V 10/761* (2022.01); *G06V 10/993* (2022.01); *G06V 40/172* (2022.01); *G06V 2201/10* (2022.01)

(58) Field of Classification Search
CPC ........ G06F 16/13; G06F 16/24; G06F 16/156; G06N 3/00; G06N 5/00; G05B 13/00; G06K 9/00268; G06K 9/00288; G06K 9/00744
See application file for complete search history.

(56) References Cited

U.S. PATENT DOCUMENTS

| | | | | |
|---|---|---|---|---|
| 10,769,415 | B1* | 9/2020 | Mostafa | G06V 40/168 |
| 11,126,826 | B1* | 9/2021 | Karakas | G06V 40/174 |
| 2010/0014721 | A1* | 1/2010 | Steinberg | G06F 16/583 |
| | | | | 382/118 |
| 2010/0066822 | A1* | 3/2010 | Steinberg | G06V 40/173 |
| | | | | 382/118 |
| 2011/0243397 | A1* | 10/2011 | Watkins | G06F 16/5854 |
| | | | | 715/830 |
| 2012/0027268 | A1* | 2/2012 | Kwan | G06F 16/5838 |
| | | | | 382/118 |
| 2012/0213490 | A1* | 8/2012 | Steiner | G11B 27/34 |
| | | | | 386/E9.011 |
| 2015/0131872 | A1* | 5/2015 | Ganong | G06Q 30/0241 |
| | | | | 382/118 |
| 2015/0193471 | A1* | 7/2015 | Shochat | G06F 16/29 |
| | | | | 707/722 |
| 2016/0073010 | A1* | 3/2016 | Cronin | H04N 1/00222 |
| | | | | 348/143 |
| 2016/0292494 | A1* | 10/2016 | Ganong | G06V 40/172 |
| 2017/0017834 | A1* | 1/2017 | Sabitov | G06V 20/52 |

(Continued)

*Primary Examiner* — Hung D Le
(74) *Attorney, Agent, or Firm* — Reches Patents

(57) ABSTRACT

Computerized systems, and method and computer readable media that store instructions for history based face recognition.

17 Claims, 4 Drawing Sheets

(56) References Cited

U.S. PATENT DOCUMENTS

| | | | | |
|---|---|---|---|---|
| 2017/0169237 | A1* | 6/2017 | Calo | G06F 21/83 |
| 2018/0046855 | A1* | 2/2018 | Ganong | G06V 40/171 |
| 2018/0068173 | A1* | 3/2018 | Kolleri | G06Q 10/10 |
| 2018/0268747 | A1* | 9/2018 | Braun | G06V 40/172 |
| 2020/0074151 | A1* | 3/2020 | Resnick | G06V 20/52 |
| 2020/0293756 | A1* | 9/2020 | Ainsworth | G06V 40/161 |
| 2020/0387693 | A1* | 12/2020 | Donnenfeld | A63D 5/04 |
| 2021/0097263 | A1* | 4/2021 | Scott | G06F 16/784 |
| 2021/0104159 | A1* | 4/2021 | Tsai | G06V 40/173 |
| 2021/0176239 | A1* | 6/2021 | Rose | H04W 12/72 |
| 2021/0182539 | A1* | 6/2021 | Rassool | G06V 30/19173 |
| 2021/0209346 | A1* | 7/2021 | Resnick | H04L 9/3231 |
| 2021/0216749 | A1* | 7/2021 | Trani | G06V 40/172 |
| 2021/0216750 | A1* | 7/2021 | Trani | G06V 10/7747 |
| 2021/0216752 | A1* | 7/2021 | Trani | G06V 40/165 |
| 2021/0280008 | A1* | 9/2021 | Soukup | G07F 17/3239 |
| 2021/0287469 | A1* | 9/2021 | Ryhorchuk | G06V 40/172 |
| 2021/0294837 | A1* | 9/2021 | Ensing | G06F 16/535 |
| 2022/0029987 | A1* | 1/2022 | Salter | H04L 9/3218 |
| 2022/0058382 | A1* | 2/2022 | LiVoti | H04N 21/6582 |

* cited by examiner

UNSUPERVISED SIGNATURE-BASED PERSON OF INTEREST DATABASE POPULATION

BACKGROUND

A facial recognition computerized system is a software application used for identification of a person's face from an image or video frame captured from a camera or video source. It is a biometric tool used to help link the identity of a person to an appearance at a specific time or place.

Current solutions are limited to search in databases of persons previously tagged as being persons of interest.

There is a growing need to provide an efficient method for facial recognition.

SUMMARY

There may be provided computerized systems, methods and computer readable medium as illustrated in the specification.

BRIEF DESCRIPTION OF THE DRAWINGS

The embodiments of the disclosure will be understood and appreciated more fully from the following detailed description, taken in conjunction with the drawings in which.

DESCRIPTION OF EXAMPLE EMBODIMENTS

Figure 1:
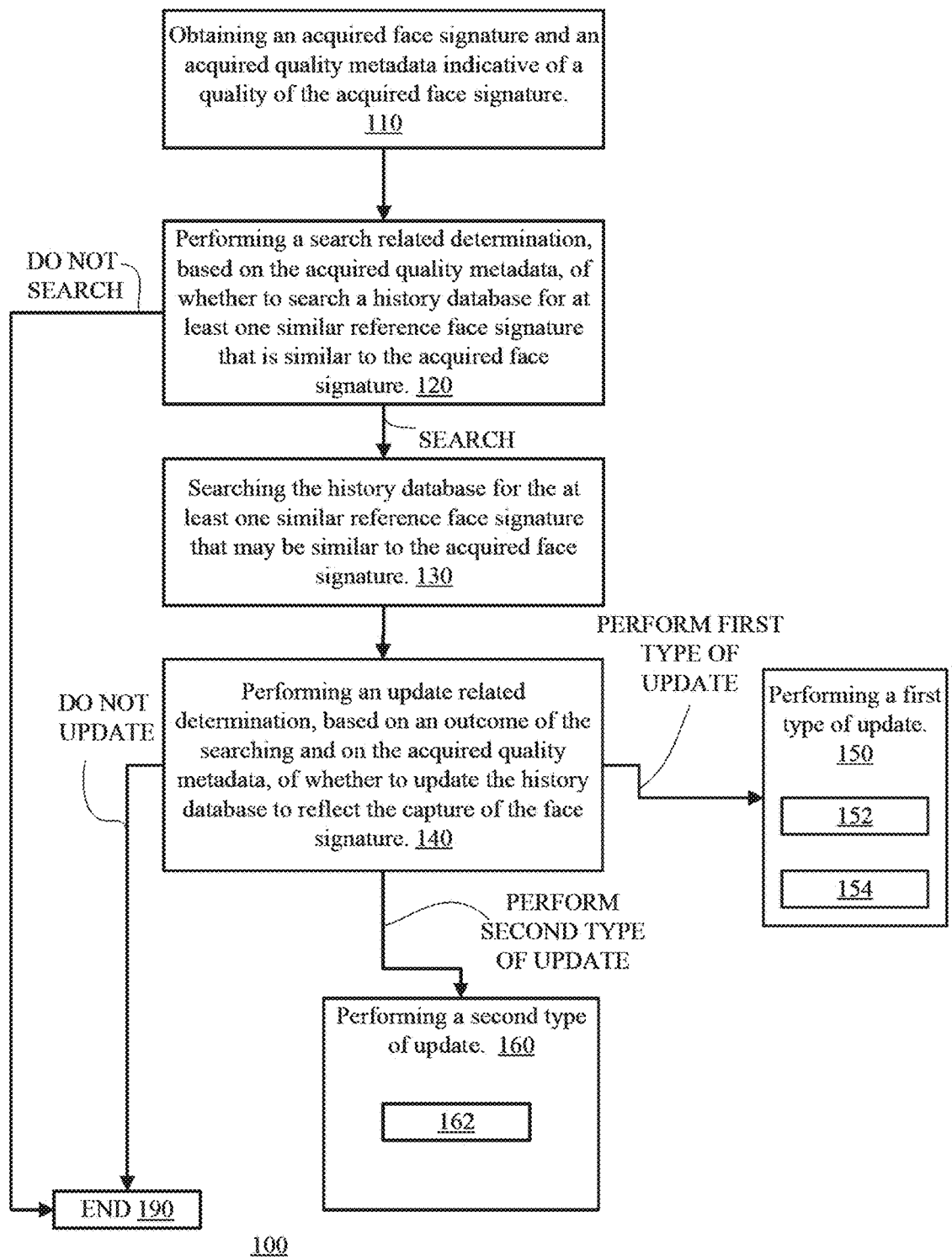
FIG. 1 illustrates an example of a method.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a device or computerized system capable of executing the method and/or to a non-transitory computer readable medium that stores instructions for executing the method.

Any reference in the specification to a computerized system or device should be applied mutatis mutandis to a method that may be executed by the computerized system, and/or may be applied mutatis mutandis to non-transitory computer readable medium that stores instructions executable by the computerized system.

Any reference in the specification to a non-transitory computer readable medium should be applied mutatis mutandis to a device or computerized system capable of executing instructions stored in the non-transitory computer readable medium and/or may be applied mutatis mutandis to a method for executing the instructions.

Any combination of any module or unit listed in any of the figures, any part of the specification and/or any claims may be provided.

The specification and/or drawings may refer to an image. An image is an example of a media unit. Any reference to an image may be applied mutatis mutandis to a media unit. A media unit may be an example of sensed information unit. Any reference to a media unit may be applied mutatis mutandis to sensed information. The sensed information may be sensed by any type of sensors—such as a visual light camera, or a sensor that may sense infrared, radar imagery, ultrasound, electro-optics, radiography, LIDAR (light detection and ranging), etc.

The specification and/or drawings may refer to a processor. The processor may be a processing circuitry. The processing circuitry may be implemented as a central processing unit (CPU), and/or one or more other integrated circuits such as application-specific integrated circuits (ASICs), field programmable gate arrays (FPGAs), full-custom integrated circuits, etc., or a combination of such integrated circuits.

Any combination of any steps of any method illustrated in the specification and/or drawings may be provided.

Any combination of any subject matter of any of claims may be provided.

Any combinations of computerized systems, units, components, processors, sensors, illustrated in the specification and/or drawings may be provided.

Any reference to any of the term "comprising" may be applied mutatis mutandis to the terms "consisting" and "consisting essentially of".

Any reference to any of the term "consisting" may be applied mutatis mutandis to the terms "comprising" and "consisting essentially of".

Any reference to any of the term "consisting essentially of" may be applied mutatis mutandis to the terms "comprising" and "comprising".

The analysis of content of a media unit may be executed by generating a face signature of the media unit and by comparing the face signature to reference face signatures. The reference face signatures may be arranged in one or more concept structures or may be arranged in any other manner. The face signatures may be used for object detection or for any other use.

The term "substantially" means insignificant deviation—for example differences that do not exceed few percent of a value, differences that are below the accuracy and/or resolution related to the face recognition process. What is substantially may be defined in any manner.

There may be provided a computerized system, a method and a non-transitory computer readable medium for history based face recognition.

The method may utilize reference face signatures and an acquired face signature. The reference face signatures may belong to a history database.

The history database may include one or more data structures of any type that may be stored in one or more memory units. The terms memory units and storage units are used in an interchangeable manner. The one or more memory units may be included on one or more data centers, in a cloud environment, or in any other computerized system and/or connected by any type of network.

An acquired face signature is a face signature of a captured face—a face captured in an acquired image.

The acquired face signature is compact in the sense that the size of the acquired face signature is smaller (even much smaller—for example less than 10, 5, 1, 0.5, 0.1 percent) than the size of the visual information of the acquired face within the acquired image. The visual information may include, for example, all the pixels of the image that convey the captured face—including pixel values such as color and/or monochromatic values. The acquired face signature may be of a size that is smaller that a predefined value—for example below 100, 50, 25, 10, 5 kilobits.

The face signature may be generated by a lossy process in the sense that the visual information of a face in an image can not be constructed from the face signature. By storing face signatures and not the raw image data—the privacy of persons having their face captured and represented by face signatures—is maintained.

The face signatures may be generated in various methods. Non-limiting examples of face signatures, generating face signatures and searching for similar (for example matching) face signatures is illustrated in U.S. patent application Ser. No. 16/544,940 filing date Aug. 20, 2019 which is incorporated herein by reference.

An appearance is defined as a sequence of face detections belonging to the same person, recorded in the same camera or video, and gathered in the same timeframe. An appearance begins once a new face is detected in a frame, and ends if the face did not appear in any following frame for a preconfigured time period (TTL). Each detected facial image in an appearance is automatically indexed into a face signature.

Indexing an acquired image into a face signature may be a multistep process. First, the acquired image may be cropped into an acquired cropped image containing a single face, then the cropped image is processed (for example U.S. patent application Ser. No. 16/544,940, or using any other method—for example by passing the image through one or more neural networks), and finally converted into a face signature. The resulting acquired face signature is a representation of the distinct facial attributes extracted from the acquired cropped image.

It should be noted that the cropping of the acquired image may be replaced by calculating an acquired face signature only on a part of the acquired image.

The quality of an acquired face signature may be considered in one or more processes. For example—when determining whether to search a history data base for finding one or more similar reference face signatures. Yet for another example—when determining whether to update the history database by adding an acquired face signature.

One or more parameters may be used to measure quality, including (for example) the recorded pose of the face and yaw values of the face, a number of facial attributes identified, the identity of the facial attributed identified, and the quality of the image itself (resolution, sharpness, lighting, etc). The parameters may be consolidated into a quality variable referred to as Facescore. The parameters may be represented in any other manner.

Facescore may be, for example, a whole number value that can be used to identify if a facial image (and its indexed face signature) is of sufficient quality for actions involving the history database.

The history database may include reference face signatures, appearance metadata and a person identifier mapped to the reference face signatures and the appearance metadata. If a person is associated with multiple appearances then the appearance metadata related to these multiple appearances are clustered or otherwise mapped to the person identifier of the person. Different appearances may be associated with different cameras and/or different time periods.

The history database may store one or more reference face signatures per person. A maximal number of reference face signatures may be defined per person. The maximal number may be one or more.

The one or more reference face signatures may be updated to replace an old reference face signature of a person with a new reference face signature of a better quality. The update may be trigged each time a new face signature of the person is received, per each time period, or based on any other event.

The history database may provide an easy and fast retrieval of information regarding one or more previous appearances of a person having its face captured in an acquired image. The history data base also allows querying appearances by defining filters such as a timeframe, specific camera(s) or video(s) or any other attribute to associate groups of persons.

A history matcher may receive an acquired face signature and may search the history database (especially the reference face signatures fields) for at least one similar reference face signature.

Once a similar face signature is found—the person identifier associated with the similar face signature is used to obtain one or more appearances associated with the person identifier. In this stage the results may be filtered using one or more filtering parameters (such as timeframe, camera, and the like) to provide relevant appearance metadata.

An appearance may not have a person identifier (for example—when the appearances is not associated with any face signature that has a high enough Facescore). These appearances without person IDs may still be retrieved when using or combining parameters such as camera(s) or timeframe.

A person identifier should have at least one face signature and appearance associated with it.

It should be noted that the visual information regarding captured faces may be maintained and can be saved —one or more captured face visual information per appearance, one or more captured face visual information per person identifier, and the like. Maximal number of captured face visual information per appearance and/or per person identifier can be defined. The selection of which captured face visual information can be based on quality (best quality) or based on any other parameter.

By using only compact face signatures, the speed of querying and matching acquired face signatures and reference face signatures is improved enormously. This allows swift retrieval of records within large scale history database in milliseconds. When a match between face signatures is made, the acquired images (cropped or not) may also be displayed (if such visual information exists).

In the suggested method indexing may happen once, while the face signature is generated from the cropped acquired image, which makes the processing and handling of huge amounts of records very efficient, lightweight and fast (milliseconds).

The history database is dynamic with the ability to automatically improve themselves as new appearances of the same person identifier are made.

Searching for a similar reference face signature in the history database can be used to find all previous appearances of a person of interest, even before the persons are defined as a person of interest into the computerized system.

In accordance with emerging data regulations, the history database may not include facial images associated with an appearance. Even if facial images are not saved, it is still possible to search and find relevant appearances using only the face signatures.

Storing a best (or at least having at least a predefined quality) reference face signature of a person, and merging them to the same person identifier allows using powerful queries to provide the total number of unique persons per camera or area.

A New Appearance Entering the History Database.

A video stream may be received, and processed to provide acquired images.

One or more acquired images may include a captured face of a person.

An acquired image that include a captured face may be cropped to provide an acquired cropped image.

The cropped image is indexed into an acquired face signature.

The Facescore of the signature is evaluated and a determination is made of whether it is sufficient to search in the history database.

The acquired face signature is sent to the history database to be compared with reference face signatures A New Unique Person Identifier Record is Created.

The acquired face signature is not similar to any reference face signatures.

A determination, based on the Facescore of the acquired face signature, is made of whether to add the acquired face signature to the history database.

A new person identifier for this appearance's face signature is generated.

The appearance and face signature are now associated with this new person ID.

An Existing Person Identifier Record is Updated.

The acquired face signature matches a reference face signature with a person identifier based on a defined threshold.

The new appearance and acquired face signature are now associated with this person identifier.

A determination, based on the Facescore of the acquired face signature, is made of whether to update the history database.

The person identifier is checked to see if it is at maximal capacity for the number of reference face signatures it can store.

If the max is not reached, the acquired face signature is added to this person identifier. If the max is reached, the acquired face signature is compared to the person identifier face signature with the lowest Facescore.

If the acquired face signature has a higher Facescore, it will replace the person identifier reference face signature of lowest quality.

Searching the History Database.

An acquired image is received.

The acquired image is cropped to provide a cropped image that includes just the captured face.

The cropped image is indexed and converted into an acquired face signature.

The acquired face signature is searched in the history database to be compared with reference face signatures.

The input face signature matches the face signature of an appearance stored in the history database based on a defined threshold.

The matched face signature(s) has a person ID.

The person identifier is queried, returning all appearances existing in the history database with this person ID.

All appearances with the person identifier are then filtered based on the initial input request.

The filtered appearances are displayed to the user. The display may include displaying relevant information such as its image (if such exists).

FIG. 1 illustrates an example of method 100.

Method 100 may be executed during a generation and/or update of a history database.

Method 100 may start by step 110 of obtaining an acquired face signature and an acquired quality metadata indicative of a quality of the acquired face signature.

The obtaining may include generating the acquired face signature and generating the acquired quality metadata.

The obtaining may include receiving the acquired face signature and generating the acquired quality metadata.

The obtaining may include receiving the acquired face signature and receiving the acquired quality metadata.

The generating may include receiving an acquired image that comprises a captured face and calculating the acquired face signature. This may include detecting the captured face, generating a cropped image and calculating the acquired face signature. Alternatively, this may include detecting the captured face, generating a cropped image, sending the cropped image to a signature generator to calculate the acquired face signature.

The acquired face signature may be a face signature of a captured face of an acquired person.

The captured face may be captured in an acquired image. A size of the acquired face signature may be smaller than a size of visual information of the captured face in the acquired image.

Non-limiting examples of face signature generator and searching for similar (for example matching) face signatures is illustrated in U.S. patent application Ser. No. 16/544,940 filing date Aug. 20, 2019 which is incorporated herein by reference.

Step 110 may include calculating the quality metadata based on a pose of the captured face, a yaw value of the captured face, one or more facial attributes of the captured face, and the quality of the acquired image.

A calculation of the quality metadata may include, for example by calculating a "facescore". The facescore may be calculated during a calculation of a signature of a cropped image of a face—or may be calculated regardless of the signature generation. The facescore may calculated on different attributes which are based on the face image itself and it's matching signature. Each attribute may have it's own weight which affects the overall facescore of the face.

The facescore may be responsive to the size of the face—calculated based on the width & height of the face crop. (width×height=bounding box dimensions). For example—a larger bounding box will contribute to the overall face score while smaller bounding box may not.

The facescore may be responsive to sharpness. The sharpness may be calculated based on the face crop image. The sharpness may be calculated based on a visibility of the face based on the amount of pixels. Higher sharpness score will contribute to the overall face score while lower may not.

The facescore may be responsive to landmarks location—calculated based on the visibility of the eyes, nose and mouth on the face crop. face image where the 5 features above are visible and clear (e.g no sunglasses, face mask, etc) will contribute to the overall face score while face images where all of the attributes or some of them are covered will not do the same. The facescore may be responsive to matching probability that may be calculated based on the face signature and the probability it will match in high confidence to other signatures. this calculation is done according to the amount of general vs unique elements in the signature itself. signatures which has more common elements will more likely match other signatures and therefore will receive a lower face score while for a signature with a lot of unique features it will be less likely and therefore it will receive a higher face score.

Step 110 may be followed by step 120 of performing a search related determination, based on the acquired quality metadata, of whether to search a history database for at least one similar reference face signature that is similar to the acquired face signature.

The history data base stores a mapping between reference face signatures, person identifiers, and appearance metadata.

The history database may consist essentially of the reference face signatures, person identifiers, appearance metadata, and the mapping.

The history database may or may not include visual information regarding the captured faces—such as the cropped images.

For example—if the quality of the acquired face signature is not high enough (for example does not exceed a first quality threshold)—then no search is conducted and step 120 is followed by END step 190.

If determining to conduct the search—step 120 may be followed by step 130 of searching the history database for the at least one similar reference face signature that may be similar to the acquired face signature.

Step 130 may consist essentially of accessing fields of the history database that store reference face signatures.

Step 130 may be followed by step 140 of performing an update related determination, based on an outcome of the searching and on the acquired quality metadata, of whether to update the history database to reflect the capture of the face signature.

Step 140 may include determining not to update the history database (jumping to step END 190). For example—if the quality of the acquired face signature is not high enough (for example does not exceed a second quality threshold)—then no update is made and step 140 is followed by END step 190.

The second quality threshold may equal the first quality threshold or may differ from the first quality threshold. For example—the second quality threshold may exceed the first quality threshold.

The value of each one of the first quality threshold and the second quality threshold can be determined in any manner—and based on any considerations—can be fixed or may be updated over time.

Step 140 may include determining to perform a first type of update —when determining to update the history database and finding any similar reference face signature. In this case step 140 is followed by step 150 of performing a first type of update.

Step 140 may include determining to perform a second type of update —when determining to update the history database and not finding any similar reference face signature. In this case step 140 is followed by step 160 of performing a second type of update.

Step 150 includes performing a first type of update.

Step 150 may include step 152 of updating appearance metadata related to the acquired person. The appearance metadata is related to the acquired person and is indicative of one or more appearances of the person. A single appearance of the person spans along a time window during which the captured face appeared multiple times in compliance with a continuity of capture constraint. The capture constraint may defined one or more maximal allowable time gaps between times of capture of a captured face of the acquired person in a video stream.

Step 150 may include step 154 of determining, based on the acquired quality metadata and reference quality metadata of at least one similar reference face signatures, whether to store the acquired image face signature in the history database.

Step 150 may include step 156 (follows step 154) of replacing a similar reference face signature with the acquired image face signature.

Step 160 includes performing a second type of update.

Step 160 may include step 162 of generating a person identifier to the acquired person, associating with the person identifier the acquired face signature and starting to generate appearance metadata associated with the acquired person.

Step 160 may be executed regardless of whether the acquired person was tagged as a person of interest.

Figure 2:
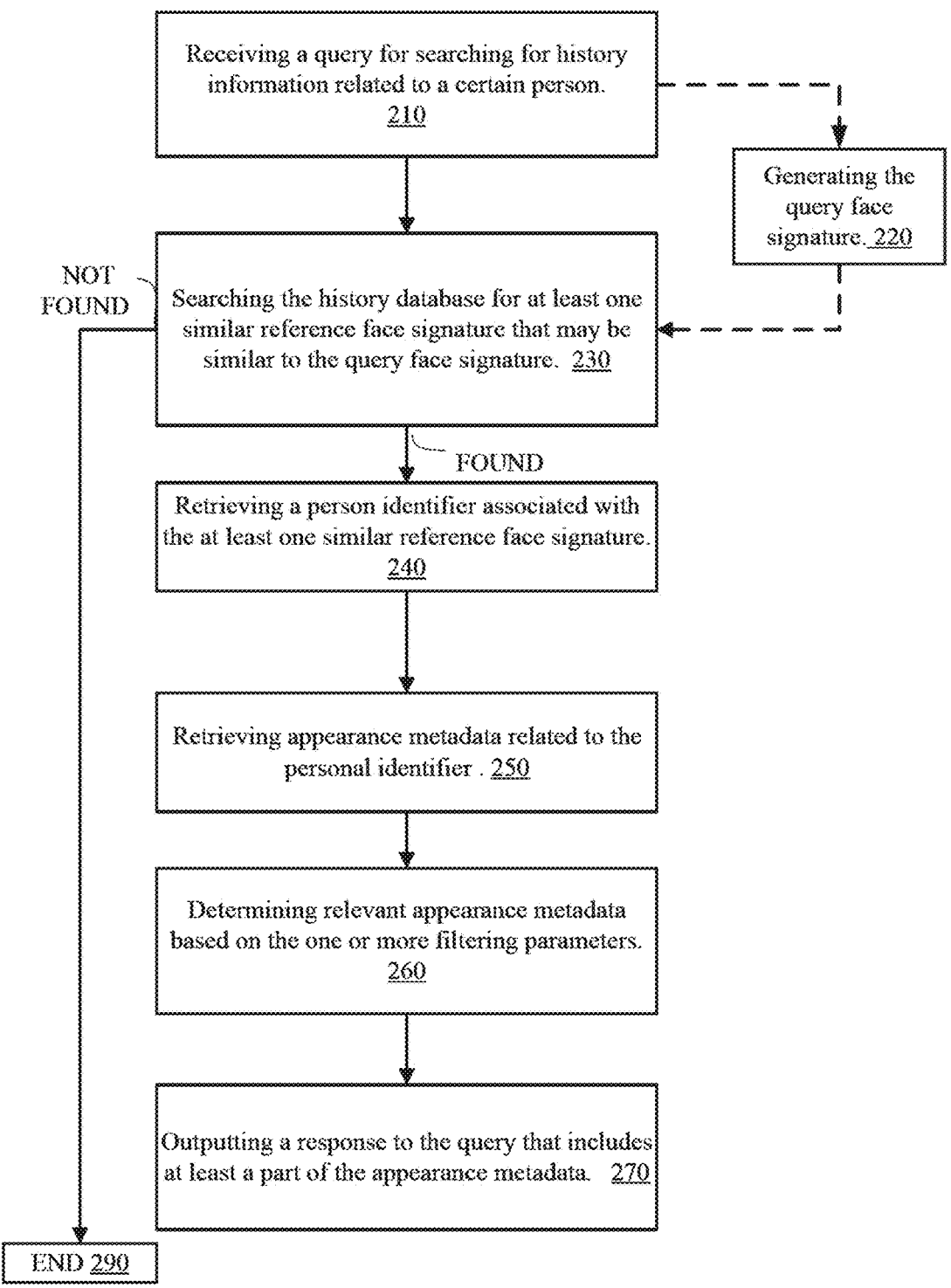
FIG. 2 illustrates an example of a method.

FIG. 2 illustrates method 200.

Method 200 may be executed during a querying of a history database.

Method 200 may start by step 210 of receiving a query for searching for history information related to a certain person.

The query may include a query face signature of the certain person or a query image (cropped or not) of the face of the certain person.

The query may also include on or more filtering parameters such as relevant time frame, relevant camera, and the like.

If the query does not include the query face signature—there is a need to perform at least one operation in order to generate the query face signature—then step 210 may be followed by step 220 of generating the query face signature.

Step 210 and/or step 220 may amount to obtaining a query face signature and optionally one or more filtering parameters.

Step 210 and step 220 (when executed) are followed by step 230 of searching the history database for at least one similar reference face signature that may be similar to the query face signature.

If finding any similar reference face signature—step 230 may be followed by step 240 of retrieving a person identifier associated with the at least one similar reference face signature.

Step 240 may be followed by step 250 of retrieving appearance metadata related to the personal identifier found in step 240.

Step 250 may be followed by step 260 of determining relevant appearance metadata based on the one or more filtering parameters.

It should be noted that the one or more filtering parameters may be applied during the retrieving of step 250.

Step 260 may be followed by step 270 of outputting a response to the query that includes at least a part of the appearance metadata.

The at least part may include the relevant appearance metadata.

The outputting may include displaying, sending to a display, sending to a memory unit, and the like.

Figure 3:
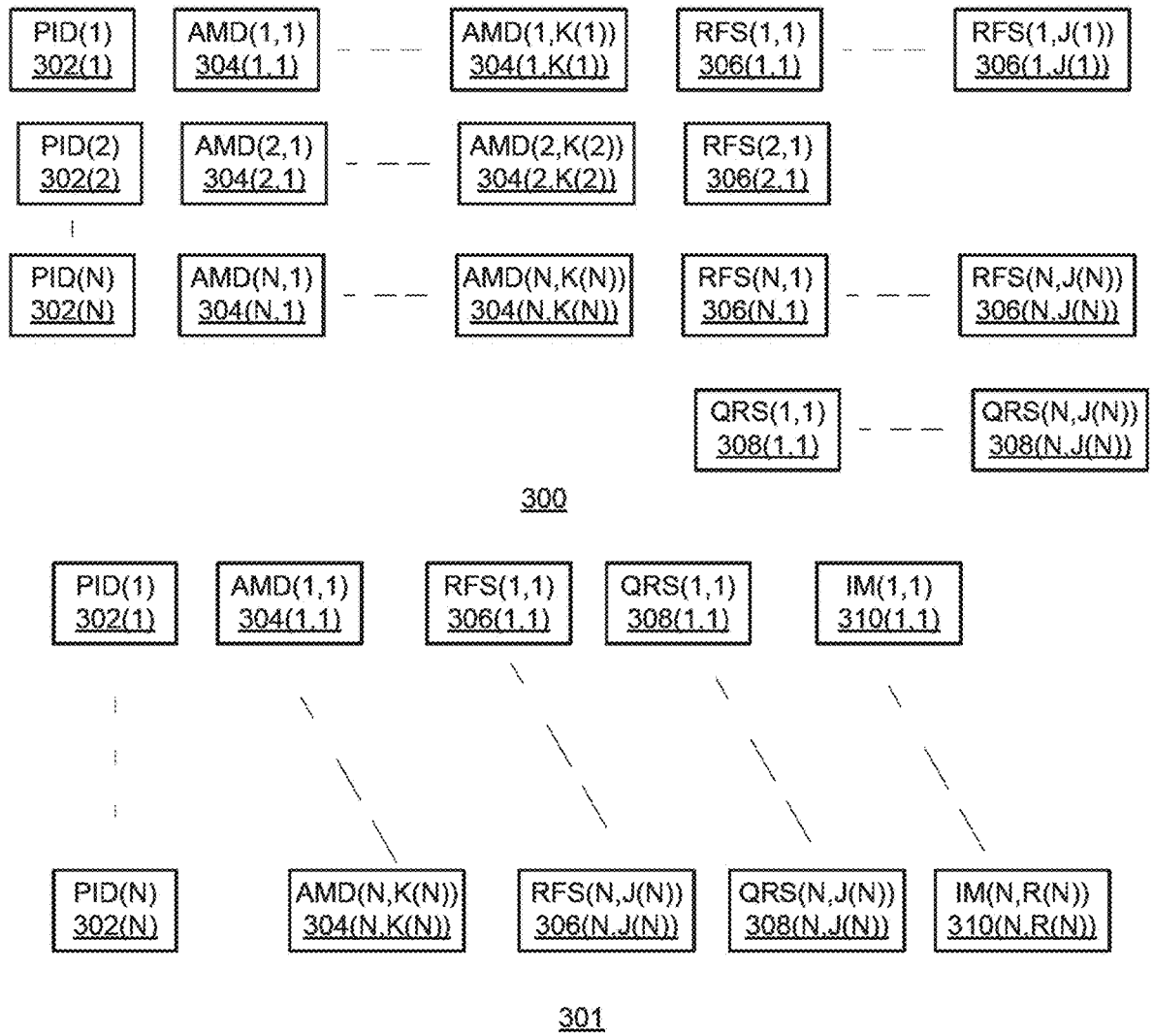
FIG. 3 is an example of data elements.

FIG. 3 illustrates examples of various data structures.

History database 300 includes person identifiers 302(1)-302(N), appearance metadata 304(1,1)-304(N,K(N)), and reference face signatures 306(1,1)-306(N,J).

N, K and J are integers that exceed one. Index n (ranges between 1 and N) is indicative of the person—the n'th person identifier 302(n) is associated with (mapped to) appearance metadata 304(1,1)-304(1,K(n)), and with reference face signatures 306(1,1)-306(1,J(n)).

K(n) is the number of appearances that is currently associated with the n'th person. K(n) may be one or may exceed one.

J(n) is the number of reference face signatures that is currently associated with the n'th person. J(n) may be one or may exceed one. The maximal number of J(n) may be limited. There may be one or more reference face signatures per appearance or per person.

Different persons may be associated with different values of K(n) and J(n). The values of K(n) and J(n) may change when the history database is updated.

The appearance metadata may associated with face signatures—for example may include links to face signatures.

Appearance metadata may indicate the source of the image (for example one or more cameras) and timing information—for example, the start time and the end time of the appearance.

The history database may include quality metadata—for example quality metadata per reference face signature—308(1,1)-308(1,J(n)).

History database 300 does not include images of the reference faces. The reference face signature may not allow to reconstruct these images.

History database 301 includes person identifiers 302(1)-302(N), appearance metadata 304(1,1)-304(N,K(N)), reference face signatures 306(1,1)-306(N,J), and one or more images 308(1,1)-308(1,R(N)) per person. R(n) may be one, may exceed one, may be equal to the number of appearances per the n'th person, and the like.

FIG. 3 also illustrates various other data structures such as acquired image 320 (may be cropped or uncropped), acquired face signature 322, first quality threshold 324, second quality threshold 325, query 330, one or more filtering parameters 332, query face signature 334, query image 336, and response 340.

Figure 4:
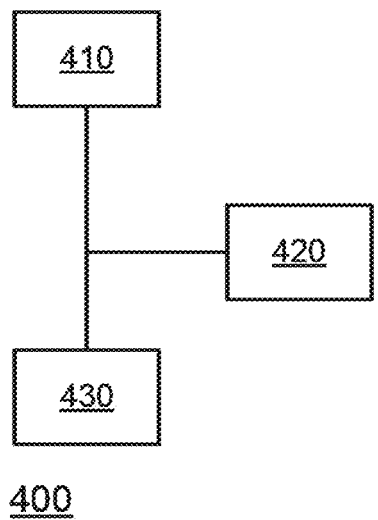
FIG. 4 illustrates an example of a computerized system.

FIG. 4 illustrates an example of a computerized system 400.

The computerized system 400 may be one or more computers, may be located in the cloud, may be located in any place and may be adapted to receive information over any network.

The computerized system 400 may include interface 410, one or more storage units 420, and one or more processors 430.

The interface 410 is for communicating with one or more requesting entities. The interface may be any type of communication unit.

The one more storage units 420 are for storing the history database 300 (or 301—or both 300 and 301) and additional information such as images, cropped images, queries, responses, intermediate results such as metadata related to a timing of appearance of captured faces in acquired images (for example for calculating the stat and end of appearances), and the like.

The one or more processors 430 are configured to execute one or more steps of method 100 and/or method 200.

The one or more processors may be configured (for example may be programmed) to operate as trackers and/or for generating appearance metadata. An example of trackers are illustrated in U.S. provisional patent Ser. No. 63/075,246 tiling date 7 Sep. 2020 which is incorporated herein by reference.

The one or more processors may be configured to access the history metadata, to update the history metadata, to respond to queries, and the like.

The one or more processors may include one or more neural network processors, may implement instructions that once executed perform neural network processing, and the like.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom." "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within the same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable sub-combination.

It will be appreciated by persons skilled in the art that the embodiments of the disclosure are not limited by what has been particularly shown and described hereinabove. Rather the scope of the embodiments of the disclosure is defined by the appended claims and equivalents thereof.

What is claimed is:

1. A method for history based face recognition, the method comprises:
obtaining an acquired face signature and an acquired quality metadata indicative of a quality associated with of the acquired face signature, the acquired face signature is a face signature of a captured face of an acquired person, the captured face is captured in an acquired image, wherein a size of the acquired face signature is smaller than a size of visual information of the captured face in the acquired image;
wherein the acquired quality metadata is calculated based on at least one of (a) a pose of the captured face, (b) a yaw value of the captured face, (c) one or more facial attributes of the captured face, (d) a sharpness of the acquired image, (e) a size of the captured face within a cropped image generated by cropping the acquired image, or (f) a resolution of the acquired image;
performing a search related determination, based on the acquired quality metadata, of whether to search a history database for at least one similar reference face signature that is similar to the acquired face signature; wherein the history data base stores a mapping between reference face signatures, person identifiers, and appearance metadata;
searching the history database, when determining to search the history database, for the at least one similar reference face signature that is similar to the acquired face signature;
performing an update related determination, based on an outcome of the searching and on the acquired quality metadata, of whether to update the history database to reflect the capture of the face signature;
performing a first type of update when finding the at least one similar reference face signatures and determining to update the history database;
performing a second type of update of the history database when not finding any similar reference face signature and determining to update the history database;
wherein the search related determination requires first minimal quality level associated with the acquired face signature, wherein the update related determination required a second minimal quality level associated with acquired face signature, wherein the first minimal quality level differs from the second quality level.

2. The method according to claim 1 wherein the performing of the first type of update of the history database comprises updating appearance metadata related to the acquired person, wherein the appearance metadata related to the acquired person is indicative of one or more appearances of the person, wherein a single appearance of the person spans along a time window during which the captured face appeared multiple times in compliance with a continuity of capture constraint.

3. The method according to claim 2 wherein the continuity of capture constraint defines one or more maximal allowable time gaps between times of capture of a captured face of the acquired person in a video stream.

4. The method according to claim 1 wherein the performing of the first type of update of the history database comprises determining, based on the acquired quality metadata and reference quality metadata of at least one similar reference face signatures, whether to store the acquired image face signature in the history database.

5. The method according to claim 4 wherein the performing of the first type of update of the history database comprises replacing a similar reference face signature with the acquired image face signature.

6. The method according to claim 1 wherein the one or more facial attributes of the captured face comprise one or more captured face landmarks captured in the acquired image.

7. The method according to claim 1 wherein the visual information of the captured face is not reconstructed from the acquired face signature of the captured face.

8. The method according to claim 1 wherein the performing of the second type of update of the history database comprises generating a person identifier to the acquired person, associating with the person identifier the acquired face signature and starting to generate appearance metadata associated with the acquired person.

9. The method according to claim 1 wherein the performing of the second type of update of the history database is executed regardless of whether the acquired person was tagged as a person of interest.

10. The method according to claim 1 wherein the history database consists essentially of the reference face signatures, person identifiers, appearance metadata, and the mapping.

11. The method according to claim 1 wherein the searching consists essentially of accessing fields of the history database that store reference face signatures.

12. A non-transitory computer readable medium that stores instructions for:
obtaining an acquired face signature and an acquired quality metadata indicative of a quality associated with the acquired face signature, the acquired face signature is a face signature of a captured face of an acquired person, the captured face is captured in an acquired image, wherein a size of the acquired face signature is smaller than a size of visual information of the captured face in the acquired image; wherein the acquired quality metadata is calculated based on at least one of (a) a pose of the captured face, (b) a yaw value of the captured face, (c) one or more facial attributes of the captured face, (d) a sharpness of the acquired image, (e) a size of the captured face within a cropped image generated by cropping the acquired image, or (f) a resolution of the acquired image;
performing a search related determination, based on the acquired quality metadata, of whether to search a history database for at least one similar reference face signature that is similar to the acquired face signature; wherein the history data base stores a mapping between reference face signatures, person identifiers, and appearance metadata;
searching the history database, when determining to search the history database, for the at least one similar reference face signature that is similar to the acquired face signature;
performing an update related determination, based on an outcome of the searching and on the acquired quality metadata, of whether to update the history database to reflect the capture of the face signature;
performing a first type of update when finding the at least one similar reference face signatures and determining to update the history database; and
performing a second type of update of the history database when not finding any similar reference face signature and determining to update the history database, wherein the search related determination requires first minimal quality level associated with acquired face signature, wherein the update related determination required a second minimal quality level associated with the acquired face signature, wherein the first minimal quality level equals the second quality level.

13. The non-transitory computer readable medium according to claim 12, wherein the one or more facial attributes of the captured face comprise one or more captured face landmarks captured in the acquired image.

14. The non-transitory computer readable medium according to claim 12, wherein the performing of the first type of update of the history database comprises determining, based on the acquired quality metadata and reference quality metadata of at least one similar reference face signatures, whether to store the acquired image face signature in the history database.

15. A computerized system comprising a processor that is configured to:
obtain an acquired face signature and an acquired quality metadata indicative of a quality of the acquired face signature, the acquired face signature is a face signature of a captured face of an acquired person, the captured face is captured in an acquired image, wherein a size of the acquired face signature is smaller than a size of visual information of the captured face in the acquired image; wherein the acquired quality metadata is calculated based on at least one of (a) a pose of the captured face, (b) a yaw value of the captured face, (c) one or more facial attributes of the captured face, (d) a sharpness of the acquired image, (e) a size of the captured face within a cropped image generated by cropping the acquired image, or (f) a resolution of the acquired image;
perform a search related determination, based on the acquired quality metadata, of whether to search a history database for at least one similar reference face signature that is similar to the acquired face signature; wherein the history data base stores a mapping between reference face signatures, person identifiers, and appearance metadata;
search the history database, when determining to search the history database, for the at least one similar reference face signature that is similar to the acquired face signature;
perform an update related determination, based on an outcome of the search and on the acquired quality metadata, of whether to update the history database to reflect the capture of the face signature;
perform a first type of update when finding the at least one similar reference face signatures and determine to update the history database; and
perform a second type of update of the history database when not finding any similar reference face signature and determine to update the history database, wherein the search related determination requires first minimal quality level associated with the acquired face signature, wherein the update related determination required a second minimal quality level associated with the acquired face signature, wherein the first minimal quality level equals the second quality level.

16. The computerized method according to claim 15, wherein the one or more facial attributes of the captured face comprise one or more captured face landmarks captured in the acquired image.

17. The computerized method according to claim 15, wherein the processor is configured to perform the first type of update of the history database by updating appearance metadata related to the acquired person, wherein the appearance metadata related to the acquired person is indicative of one or more appearances of the person, wherein a single appearance of the person spans along a time window during which the captured face appeared multiple times in compliance with a continuity of capture constraint.

* * * * *